United States Patent Office 3,503,920
Patented Mar. 31, 1970

3,503,920
PROCESS FOR INCREASING VISCOSITY OF UNCURED ALKYD COPOLYMER RESINOUS MIXTURES AND PRODUCT
Syuiti Takagi, Suita, Makoto Yokoo, Toyonaka, and Yoshihiro Hatanaka, Osaka, Japan, assignors to Takeda Chemical Industries, Ltd., Osaka, Japan
No Drawing. Filed Sept. 12, 1967, Ser. No. 667,058
Claims priority, application Japan, Sept. 12, 1966, 41/60,506
Int. Cl. C08g 51/04; C08f 45/04
U.S. Cl. 260—40                                7 Claims

ABSTRACT OF THE DISCLOSURE

The viscosity of uncured alkyd resin is increased by intimately admixing the resin with calcined basic magnesium carbonate (MgO: 82 to 96%; $CO_2$: 2 to 8%; $H_2O$: 2 to 11%), and allowing the mixture to stand until the desired viscosity has been obtained. Pre-preg impregnated with thus-treated composition is tack-free and is stable to storage and transportation.

This invention relates to improved uncured alkyd copolymer resinous mixtures and corresponding polymerization product, and to a process for the preparation thereof. More particularly, it relates to (a) improved uncured alkyd copolymer resin containing a calcined basic magnesium carbonate having an analytical value of MgO: 82 to 96%, $CO_2$: 2 to 8% and $H_2O$: 2 to 11% dispersed in uncured alkyd resin, (b) the product of polymerization of the said resin, and (c) the process for the preparation thereof.

It has been substantially impossible to carry out practically so-called compression molding by using "pre-preg" material impregnated with an uncured alkyd resin because of its low viscosity and its tackiness. More concretely stated, for carrying out compression molding in practice, it is necessarily required that "pre-preg" material impregnated with uncured alkyd resin shall be capable of being safely stored for a long period of time without causing any troublesome phenomenon. However, as uncured alkyd resin shows a low viscosity and tackiness, it is inevtiable that the uncured alkyl resin flow out from the "pre-preg" material and, furthermore, because of their tackiness there may be an inter-adhesion of the "pre-preg" materials to each other during storage or transportation thereof.

Therefore, it has been a desideratum in this field to increase the viscosity and to lower the tackiness of uncured alkyd resin.

For this purpose, it has been proposed to add magnesium oxide to uncured alkyd resin (see U.S. Patent No. 2,628,209 and German Patent No. 1,131,881), and to add both magnesium oxide and an aliphatic monocarboxylic acid to uncured alkyd resin, followed by heating at rather high temperature, whereby the fatty acid is linked to the alkyd through the magnesium atom (see U.S. Patent No. 3,219,604):

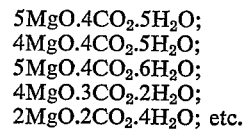

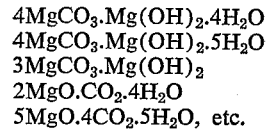

However, these known methods require a long period of time (e.g. more than 24 hours) or rather high temperature for attaining an increase of viscosity up to a desired degree. Furthermore, the latter of the said processes requires the addition of a relatively large quantity of the aliphatic mooncarboxylic acid, which often brings on undesirable effects.

According to the present invention, the addition of calcined basic magnesium carbonate having a specific analytical value of MgO: 82 to 96%, $CO_2$: 2 to 8% and $H_2O$: 2 to 11% to an uncured alkyd resin, brings about a remarkable increase in the viscosity of the said resin a short time (e.g. 4 to 8 hours) at room temperature (without heating).

It is the principal object of the present invention to provide an improved uncured tack-free alkyd resin having high viscosity in the uncured condition.

Another object of the invention is to provide a novel process for increasing the viscosity of an uncured alkyd resin in a very short time, without heating the said resin and/or without employing an aliphatic monocarboxylic acid.

A further object is to provide a novel agent for increasing the viscosity of an uncured alkyd resin.

Other objects of the present invention and advantageous features thereof will become apparent as the description of the invention proceeds.

The calcined basic magnesium carbonates employed in the present invention are those of which analytical values fall in the range of MgO: 82 to 96%, $CO_2$: 2 to 8%, and $H_2O$: 2 to 11%, preferably MgO: 87% to 94%, $CO_2$: 2 to 4% and $H_2O$: 2 to 7%. Though the carbon and hydrogen atoms in the calcined basic magnesium carbonate are combined with the magnesium atom in the form of carbonate and hydroxyl radicals (not in the form of $CO_2$ and $H_2O$) respectively, in this specification and claims they are shown by analytical values as in the conventional manner. Therefore, these compounds may by represented by the formula of $lMgO \cdot mCO_2 \cdot nOH$, wherein $l$, $m$ and $n$ are positive numbers corresponding to the analytical values.

Calcined basic magnesium carbonate having an analytical value of MgO: 82 to 96%, $CO_2$: 2 to 8% and $H_2O$: 2 to 11% can be prepared by calcining a basic magnesium carbonate until just prior to the production of magnesium oxide. The starting material, basic magnesium carbonate, corresponds to the formula $xMgO \cdot yCO_2 \cdot zH_2O$, wherein each of $x$, $y$ and $z$ is 2 to 6. For example, it may be $5MgO \cdot 4CO_2 \cdot 5H_2O$;
$4MgO \cdot 4CO_2 \cdot 5H_2O$;
$5MgO \cdot 4CO_2 \cdot 6H_2O$;
$4MgO \cdot 3CO_2 \cdot 2H_2O$;
$2MgO \cdot 2CO_2 \cdot 4H_2O$; etc.

These basic magnesium carbonates can occasionally be represented by such formulae as $4MgCO_3 \cdot Mg(OH)_2 \cdot 4H_2O$
$4MgCO_3 \cdot Mg(OH)_2 \cdot 5H_2O$
$3MgCO_3 \cdot Mg(OH)_2$
$2MgO \cdot CO_2 \cdot 4H_2O$
$5MgO \cdot 4CO_2 \cdot 5H_2O$, etc.

(see, for example, "Gmelins Handbuch der Anorganischen Chemie," Magnesium Teil B, System-Number 27, page 321, Verlag Chemie, G.m.b.H. Berlin 1939). It is well known that a basic magnesium carbonate is converted finally to magnesium oxide by calcination, but by calcining a basic magnesium carbonate under relatively moderate conditions, the calcined basic magnesium carbonate mentioned above can be easily prepared in a stable form. For example, by calcining a basic magnesium carbonate ($4MgCO_3 \cdot Mg(OH)_2 \cdot 4H_2O$), while altering the calcining temperature and time, various products are obtained as in the following table:

| Calcination temperature, °C.: | Calcination time, hours | Analytical value of calcined basic magnesium carbonate, percent | | |
|---|---|---|---|---|
| | | $CO_2$ | $H_2O$ | MgO |
| 300 | 5 | 25.9 | 10.8 | 63.3 |
| 400 | 3 | 6.80 | 10.04 | 83.16 |
| 400 | 5 | 6.42 | 9.86 | 83.72 |
| 500 | 2 | 2.66 | 6.67 | 90.57 |
| 500 | 3 | 2.49 | 6.15 | 91.36 |
| 500 | 4 | 2.49 | 7.82 | 89.69 |
| 500 | 5 | 2.66 | 6.12 | 91.22 |
| 550 [1] | 5 | 2.10 | 2.23 | 95.67 |

[1] $4MgCO_3 \cdot Mg(OH)_2 \cdot 5H_2O$, not $4MgCO_3 \cdot Mg(OH)_2 \cdot 4H_2O$, is used.

As shown in this table, the quantities of the hydroxyl and carbonate radical decrease with rising temperature and, after calcination at 500 C. for 5 hours, there remains 2 to 3% of $CO_2$ and 6 to 7% of $H_2O$. Further, by fixing the calcining temperature, there results almost uniform calcined basic magnesium carbonate, even if the calcination time is varied. However, the product obtained by calcining at about 300° C. retains a large quantity of hydroxyl and carbonate radical in it and its viscosity-increasing activity is rather poor though it is stronger than that of magnesium oxide. On the other hand, when the basic magnesium carbonate is calcined at higher than 700° C., especially above 750° C., the product is obtained as magnesium oxide itself which has very poor viscosity-increasing activity. Additionally, the calcined basic magnesium carbonate within the range of the analytical values of MgO: 82 to 96%, $CO_2$: 2 to 8% and $H_2O$: 2 to 11% is very voluminous, but the product (MgO) prepared by the calcination of a basic magnesium carbonate at 750° to 1000° C. shows large particles and small volume as well as low viscosity-increasing activity.

Thus, the calcined basic magnesium carbonate employed in the present invention is most advantageously prepared by calcining the basic magnesium carbonate at about 350° to 700° C., more desirably at about 400° to 550° C.

As the uncured alkyd resins in the invention, there may be employed any of those per se known (see, for example, U.S. Patent No. 2,255,313 and 2,667,430), and especially there may be used advantageously those comprising at least a monomer having polymerizable double bond and unstaurated polyester resin of acid number of 10 to 100, the unsaturated polyester resin being prepared by condensation polymerization of $\alpha,\beta$-unsaturated polycarboxylic acids and diols with or without saturated or aromatic polycarboxylic acids. As the $\alpha,\beta$-unsaturated polycarboxylic acids, there can be employed, for example, maleic acid, fumaric acid, itaconic acid, etc., and as the saturated or aromatic polycarboxylic acids there may be employed, for example, phthalic acid, iso-phthalic acid, terephthalic acid, tetrahydrophthalic acid, endomethylene tetrahydrophthalic acid, hexachloro-endomethylene phthalic acid, tetrachlorophthalic acid, tetrabromophthalic acid, etc. The diols are exemplified, for example, by propylene glycol, dipropylene glycol, ethylene glycol, diethylene glycol, bisphenol A, hydrogenated bisphenol A, neo-pentyl glycol, trimethyl pentanediol, butanediol, hexanediol, hydroxyethers of bisphenol A, etc. As a monomer having polymerizable double bond, there can be employed, for example, styrene, vinyl toluene, methyl methacrylate, vinyl acetate, diallyl phthalate, triallyl cyanurate, etc. To uncured alkyl resin there may be further added, if desirable, suitable polymerization inhibitor (e.g. hydroquinone, quinone, tertiary butyl catechol, copper compounds, etc.), polymerization catalyst (e.g. peroxidic materials such as benzoyl peroxide, hydroperoxides such as tertiary butyl hydroperoxide, ketone peroxides such as methyl ethyl ketone peroxide, perbenozate such as tertiary butyl perbenzoate), stabilizer (e.g. phenol derivatives such as butylated hydroxytoluene, butylated hydroxy-anisol, etc.), reinforcing fibrous material, pigment, dye, antioxidant, fire-proofing agent, filler and other additives.

According to the present invention, the calcined basic magnesium carbonate having an analytical value of MgO: 82 to 96%, $CO_2$: 2 to 8% and $H_2O$: 2 to 11%, preferably MgO: 87 to 92%, $CO_2$: 2 to 3% and $H_2O$: 6 to 7%, is added to the uncured alkyd resin.

The addition may be effected even during the preparation of the uncured alkyd resin. The calcined basic magnesium carbonate is usually added in the amount of about 1 to 7 parts, preferably 1 to 4 parts per 100 parts of uncured alkyd resin. The viscosity of thus-obtained mixture is increased very rapidly (e.g. after 4 to 8 hours) without heating or adding any other compounds. The mixture can be used for casting, laminating, molding or preparing "pre-preg" material by impregnating into fibrous material.

Further, fibrous material (pre-preg) impregnated with the present resin composition is tack-free, and there is never observed a flow-out of the resin in the impregnated material. Therefore, the fibrous material (pre-preg) impregnated with the present resin can be safely stored or transported for a long period of time without causing any troublesome phenomenon, such as adhesion of pre-pregs with each other or flow-out of the resin impregnated, and therefore, thus-impregnated material (pre-preg) can practically and advantageously be shaped into many kinds of material by compression holding.

It is to be understood that the following examples are solely for the purpose of illustration and are not intended to be construed as limitations of this invention, and that variations may be resorted to without departing from the spirit and scope of this invention. In the preceding portion of the specification and in the examples, temperatures are all uncorrected, and percentages and parts are all on the weight basis.

EXAMPLE 1

(A) Preparation of uncured alkyd copolymer

A mixture of 60 mol parts of iso-phthalic acid and 100 mol parts of propylene glycol is heated at 175° to 177° C. until polyester resin having an acid number of 20 is obtained. To this polyester resin, there is added 0.04 mol part of hydroquinone and 40 mol parts of maleic acid anhyrdide. The mixture is heated at 190° to 200° C. until unsaturated polyester resin copolymer having an acid value of 14 is obtained.

200 parts of thus-obtained unsaturated polyester resin copolymer are dissolved in 200 parts of styrene to give uncured alkyd copolymer.

(B) Preparation of calcined basic magnesium carbonate

Calcination of basic magnesium carbonate is carried out at variuos temperatures and various calcination times to obtain the calcined basic magnesium carbonates set forth in the table which follows:

[As the starting basic magnesium carbonate, the compound designated as $4MgCO_3 \cdot Mg(OH)_2 \cdot 4H_2O$ is employed for runs A, B, and C, and the compound designated as $4MgCO_3 \cdot Mg(OH)_2 \cdot 5H_2O$ is employed for runs D, E and F.]

| Run: | Calcination temperature, °C. | Calcination time, hours | Analytical value of calcined basic magnesium carbonate, percent | | |
|---|---|---|---|---|---|
| | | | MgO | $CO_2$ | $H_2O$ |
| A | 500 | 2 | 90.67 | 2.66 | 6.67 |
| B | 400 | 5 | 83.72 | 6.42 | 9.86 |
| C | 300 | 5 | 63.30 | 25.90 | 10.80 |
| D | 550 | 5 | 95.67 | 2.10 | 2.23 |
| E | 560 | 5 | 96.22 | 2.09 | 1.69 |
| F | 500 | 3 | 93.80 | 3.54 | 2.66 |

(C) Preparation of uncured alkyd resin copolymer

Each of the calcined basic magnesium carbonates is compounded in accordance with the following formulation:

|  | Parts |
|---|---|
| Uncured alkyd copolymer | 100 |
| Benzoyl peroxide | 1 |
| Zinc stearate | 3 |
| Calcined basic magnesium carbonate (variable) | 2 |

In each of the control runs G, H, I, J and K, the following elements are used, respectively, in place of the calcined basic magnesium carbonate.

| Run: | Elements |
|---|---|
| G | 2 parts of MgO obtained by calcination of magnesium hydroxide at 1000° C. |
| H | 2 parts of MgO (JIS[1] Special Grade). |
| I | 2 parts of MgO (JIS First Class). |
| J | 2 parts of MgO (JIS Special Grade) +7.5 parts of stearic acid. |
| K | 2 parts of MgO (JIS First Class) +15.0 parts of stearic acid. |

[1] JIS=Japanese Industrial Standard.

The mixed resins are kept standing at 25° C. and their viscosities are measured after 60 minutes, 120 minutes, 180 minutes and 240 minutes.

| Number: | \multicolumn{5}{c}{Time (minutes)} |
|---|---|---|---|---|---|
|  | 0 | 60 | 120 | 180 | 240 |
|  | \multicolumn{5}{c}{Viscosity (centipoises)} |
| A | 3,200 | 7,000 | 11,200 | 22,600 | 48,000 |
| B | 3,200 | 5,200 | 7,800 | 13,400 | 21,000 |
| C (control) | 3,200 | 4,600 | 5,700 | 7,200 | 8,600 |
| D | 3,200 | 5,000 | 7,400 | 11,200 | 18,000 |
| E (control) | 3,200 | 4,800 | 6,000 | 7,800 | 10,000 |
| F | 3,200 | 7,200 | 12,000 | 23,300 | 50,000 |
| G (control) | 3,200 | 4,000 | 4,700 | 5,250 | 6,000 |
| H (control) | 3,200 | 3,400 | 3,500 | 3,600 | 3,700 |
| I (control) | 3,200 | 3,800 | 4,000 | 4,300 | 4,600 |
| J (control) | 5,600 | 5,600 | 5,650 | 5,700 | 5,700 |
| K (control) | 7,350 | 7,400 | 7,400 | 7,600 | 7,750 |

NOTE.—In run K, the stearic acid is separated from the resin to form two layers, and the compound used in run K is therefore not suitable for use.

EXAMPLE 2

(A) Preparation of uncured alkyd copolymer

A mixture of 50 mol parts of maleic acid anhydride, 50 mol parts of phthalic acid, 100 mol parts of propylene glycol and 0.04 mol part of hydroquinone is heated at 180° to 200° C. until unsaturated polyester resin copolymer having an acid value of 30 is obtained. 200 parts of thus-obtained resin are dissolved in 160 parts of styrene.

(B) Preparation of calcined basic magnesium carbonate

Basic magnesium carbonate designated as $$4MgCO_3 \cdot Mg(OH)_2 \cdot 4H_2O$$

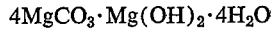

is calcined at 500° C. for 5 hours to obtain calcined magnesium carbonate having analytical values of MgO: 91.22%; $CO_2$: 2.66% and $H_2O$: 6.12%.

(C) Preparation of pre-preg mat

A compound consisting of 100 parts of uncured alkyd copolymer, 1 part of benzoyl peroxide, 3 parts of calcined basic magnesium carbonate, 3 parts of zinc stearate and 0.1 part of stabilizer (butylated hydroxytoluene) is impregnated into 50 parts of chopped-strand glass-fiber mat. The impregnated glass-fiber mat becomes tack-free after 6 to 8 hours at room temperature, and shows hardness 75 (Shore hardness meter C) after 10 to 15 hours, which hardness is most preferable for pressing, though pressing of the impregnated glass-fiber mat is possible generally whenever the said mat becomes tack-free.

On the other hand, the control using 3 parts of magnesium oxide in place of calcined basic magnesium carbonate becomes tack-free after 1 to 2 days at room temperature and requires 5 to 6 days to show the hardness of about 75.

EXAMPLE 3

A basic magnesium carbonate designated as $$4MgCO_3 \cdot Mg(OH)_2 \cdot 5H_2O$$

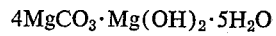

is calcined at 500° C. for 3 hours to obtain calcined basic magnesium carbonate having the analytical value of MgO: 93.80%; $CO_2$: 3.54% and $H_2O$: 2.66%. The calcined basic magnesium carbonate is further treated after the manner set forth in Example 2 (C) to give impregnated glass-fiber mat which becomes tack-free after 6 to 8 hours at room temperature and shows hardness 75 (Shore hardness meter C) after 10 to 15 hours.

Having thus disclosed the invention, what is claimed is:

1. A composition which comprises uncured alkyd resin having an acid value in the range from 10 to 100 and calcined basic magnesium carbonate having an analytical value of MgO: 82 to 96%, $CO_2$: 2 to 8% and $H_2O$: 2 to 11%, wherein the composition contains 1–7 weight parts of carbonate per 100 weight parts of resin.

2. A resinous composition which is obtained by curing a composition comprising uncured alkyd resin having an acid value in the range from 10 to 100 and calcined basic magnesium carbonate having an analytical value of MgO: 82 to 96%, $CO_2$: 2 to 8% and $H_2O$: 2 to 11%, wherein the composition contains 1–7 weight parts of carbonate per 100 weight parts of resin.

3. A process for increasing the viscosity of uncured alkyd resin, which comprises intimately admixing uncured alkyd resin having an acid value in the range from 10 to 100, and calcined basic magnesium carbonate having an analytical value of MgO: 82 to 96%, $CO_2$: 2 to 8% and $H_2O$: 2 to 11%, said carbonate being mixed in the amount of 1–7 weight parts per 100 weight parts of resin, and allowing the said mixture to stand until the desired viscosity has been obtained.

4. A process as claimed in claim 3, wherein the mixture of calcined basic magnesium carbonate and uncured alkyd resin is allowed to stand at room temperature without heating.

5. A process for producing fibrous material impregnated with uncured alkyd resin having an acid value in the range from 10 to 100, which comprises dispersing 1–7 weight parts of calcined basic magnesium carbonate having an analytical value of MgO: 82 to 96%, $CO_2$: 2 to 8% and $H_2O$: 2 to 11%, in 100 weight parts of uncured alkyd resin, and impregnating the fibrous material with the thus prepared mixture.

6. An agent for increasing the viscosity of an uncured alkyd resin having an acid value in the range from 10 to 100, which comprises calcined basic magnesium carbonate having an analytical value of MgO: 82 to 96%, $CO_2$: 2 to 8% and $H_2O$: 2 to 11%.

7. An agent for increasing the viscosity of an uncured alkyd resin as claimed in claim 8, wherein the calcined basic magnesium carbonate is prepared by calcining a basic magnesium carbonate at 400 to 550° C.

References Cited

UNITED STATES PATENTS

| 3,373,129 | 3/1968 | Kori | 260—40 |
| 3,219,604 | 11/1965 | Fischer | 260—40 |
| 3,131,148 | 4/1964 | Taulli | 260—40 |
| 2,628,209 | 2/1953 | Fisk | 260—40 |

MORRIS LIEBMAN, Primary Examiner

SANDRA M. PERSON, Assistant Examiner

U.S. Cl. X.R.

260—863